July 1, 1969  J. B. STEPHENS  3,452,730
PULSE GENERATING APPARATUS
Filed June 13, 1967  Sheet 1 of 2
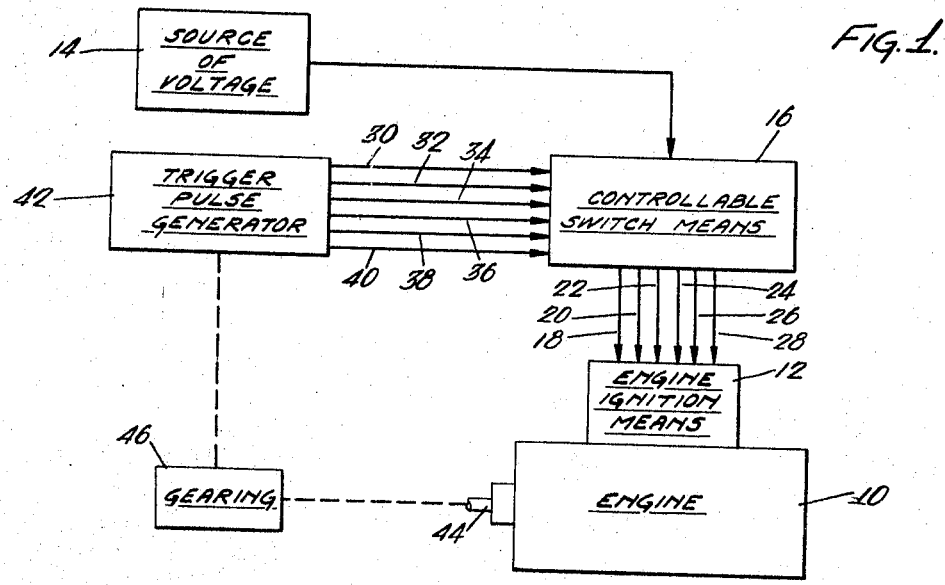
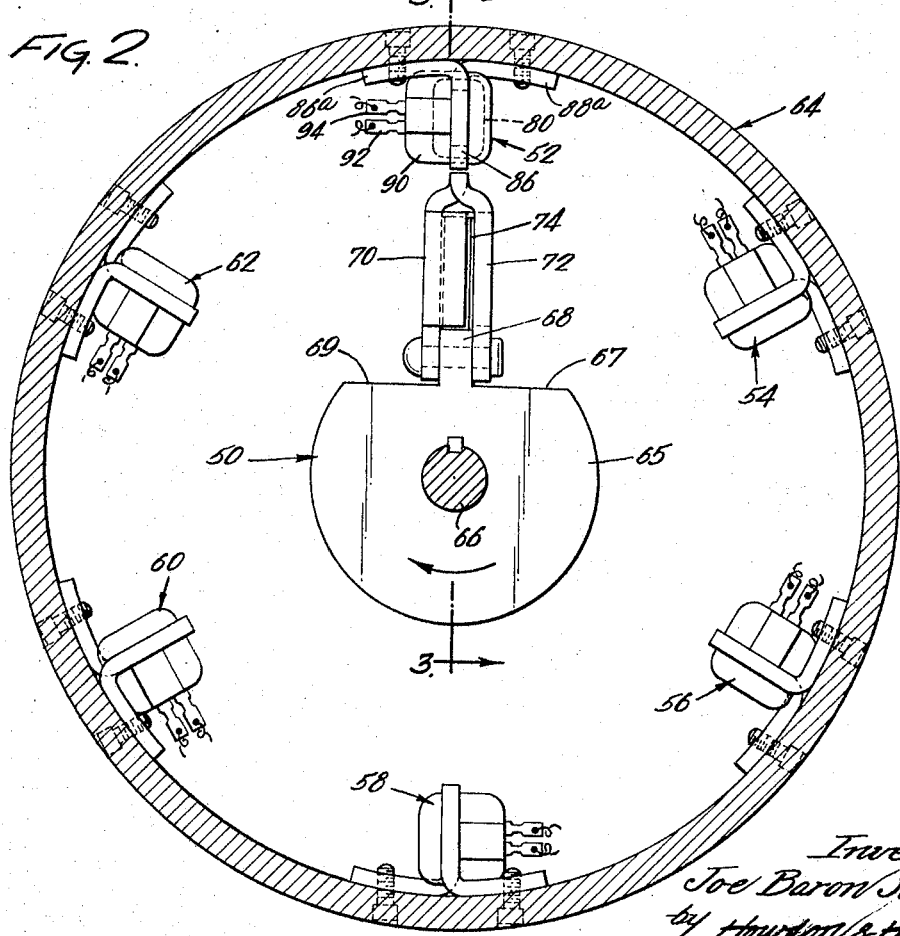
Inventor:
Joe Baron Stephens
by Howson & Howson
Attys.

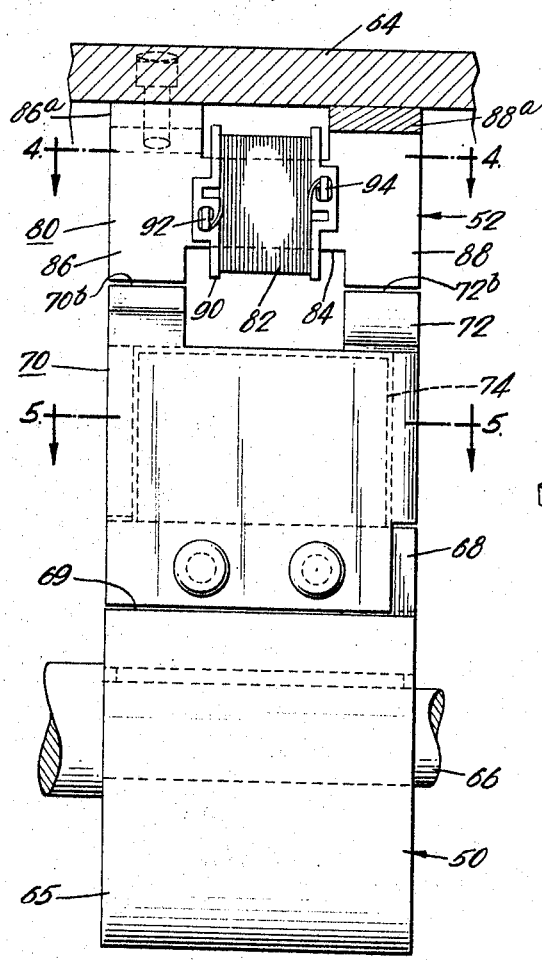
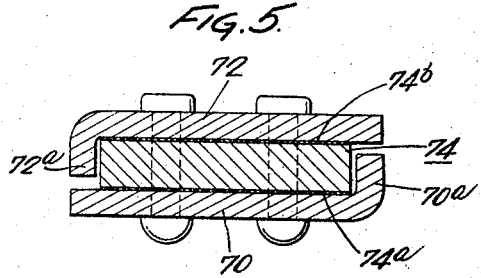
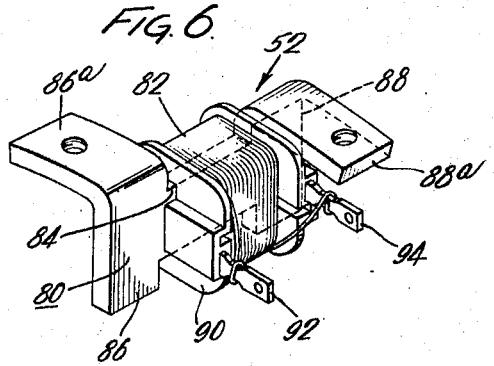
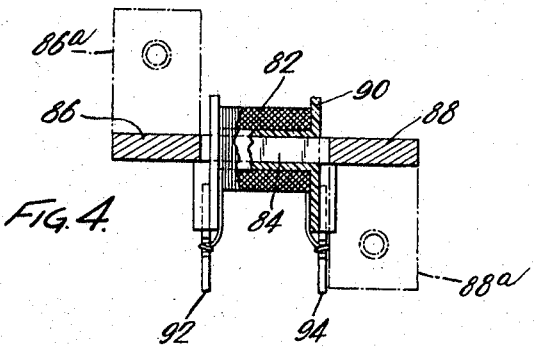
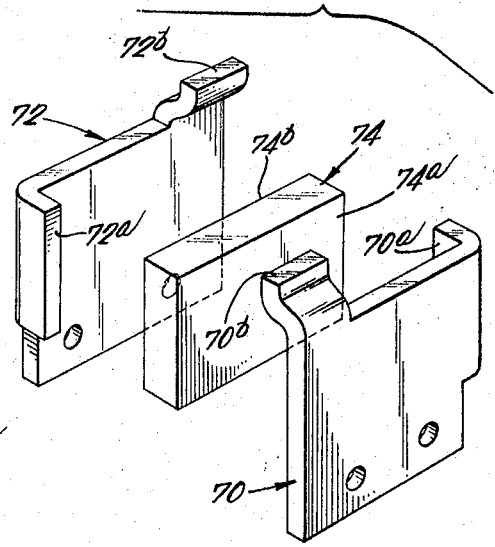

United States Patent Office 3,452,730
Patented July 1, 1969

3,452,730
PULSE GENERATING APPARATUS
Joe B. Stephens, Columbus, Miss., assignor to AMBAC Industries, Incorporated, Columbus, Miss., a corporation of New York
Filed June 13, 1967, Ser. No. 645,714
Int. Cl. F02p 1/04; H05b 39/04; H02k 21/14
U.S. Cl. 123—148                                    28 Claims

ABSTRACT OF THE DISCLOSURE

Pulse generating apparatus having a stator with a core and coil of wire wound on the core and having a rotor including non-magnetic support means, a permanent magnet having a pair of polarized faces, and pole pieces mounted on the support means having portions adjacent the polarized faces and portions extending outwardly therefrom and terminating in remote pole faces defining an outer periphery of the rotor. The core is positioned along the path of travel of the remote pole faces of the rotor so that pulses are generated in the coil as the remote pole faces move pass the core each revolution of the rotor, which pulses may be used to actuate switch means to connect a source of voltage to engine fuel ignition means of an internal combustion engine.

---

The present invention relates to a pulse generating apparatus, and particularly, to an improved apparatus having a stator and rotor structure suitable for producing control pulses for use in connection with ignition systems employed on internal combustion engines.

In the prior art, many pulse generating systems have been designed having permanent magnet flux generating means as a part of a rotor structure. The rotor structure for these prior art systems have employed, for the most part, a disc-shaped permanent magnet, having an axial opening to receive a rotatable shaft, and a pair of pole pieces of magnetic material with openings therein to receive the shaft on opposite sides of the axially-mounted disc-shaped magnet, which is face polarized. The permanent magnet and pole pieces are positioned perpendicular to the axis of rotation of the shaft, and the assembly may be held on the shaft by rivets through the pole pieces, magnet and a flange of the shaft or by spacers fixed to the shaft on opposite sides of the pole pieces.

In such prior art rotor structures, the pole pieces have been provided with arms of various shapes in order to conduct flux from the axially-mounted magnet through the pole pieces having pole faces to provide pole faces of opposite polarity at the periphery of the rotor structure. The arms of the pole pieces providing the pole faces have been of very complicated shapes when the pole faces have been generally aligned parallel to the axis of rotation of the shaft of the rotor. The arms of the pole pieces are rotated closely adjacent a core member of magnetic material, fixed to a frame relative to the rotor, on which a coil is wound so that each revolution of the rotor, the core will complete a flux path between the pole faces of the pole pieces and pulses are generated in the coil each rotation of the rotor structure. These prior art rotor structures have been expensive to manufacture and assemble, since the disc-shaped permanent magnets must be fabricated with openings for receiving the shaft and any positioning members and since the pole pieces have been fabricated with arms of complicated shapes for conducting flux to a desired pole face orientation with respect to the axis of rotation of the rotor. Furthermore, because of the lengths of the arms of the pole pieces conducting flux from the magnet to the stationary core on which the coil is wound, the magnets have had to be strong in order to provide the necessary concentration of flux for producing the desired output pulses in the coil.

In accordance with the present invention in its broader aspects of a pulse generating apparatus generally, there is provided a stator member having a core of magnetic material supported on a frame and a coil of wire wound on the core. Also employed is a rotor member comprising support means of nonmagnetic material having an axis about which the support means is to be rotated. A magnetic structure is supported on the support means at one side of its axis of rotation. The magnetic structure includes a permanent magnet having a pair of polarized faces and a pair of pole pieces having portions adjacent the polarized faces of the magnet and portions extending outwardly therefrom and terminating in remote pole faces of opposite polarity. The remote pole faces of the pole pieces define an outer periphery of the rotor. In this manner, the permanent magnet can be located adjacent the periphery of the rotor as a flat plate magnet, and can be located near the remote pole faces and, hence, passes near the core and coil assembly, which is fixed to the frame.

In preferred embodiments of the invention, the support means is provided with a radially extending flange and the pole pieces are attached to the flange with the magnet held between the pole pieces. In this arrangement the pole pieces and magnet are supported at the periphery of the rotor structure and are coupled to the flange to provide an inexpensive rotor structure to manufacture and assemble. The permanent magnet supported at the periphery of the rotor in accordance with the present invention may be of reduced magnetic intensity than required for the disc-shaped axially-mounted magnets of the prior art, since the magnet of the present invention is located closer to the remote pole faces of the rotor, and, hence, closer to the output coil of the pulse generating apparatus.

The pulse generating apparatus employing the permanent magnet rotor of the present invention is preferably employed in solid state ignition systems for internal combustion engines to provide control pulses for actuating means in the ignition system to control the generation of ignition pulses for firing ignition means on the engine in synchronism with engine operation. In the preferred use of the invention, the ignition system includes a source of voltage, engine fuel ignition means for igniting fuel in the engine, and controllable switch means for connecting the source of voltage to the engine fuel ignition means in response to control pulses. The pulse generating apparatus of the present invention generates control pulses in the coil each rotation of the rotor member and means is provided for connecting the coil to the switch means so that the switch means is responsive to the control pulses to connect the source of voltage to the ignition means for firing a spark plug of the ignition means in synchronism with engine operation. One ignition system of the type with which the present invention is preferably employed is disclosed in U.S. Patent No. 3,034,018, entitled "Transistorized Breakerless Ignition System," issued May 8, 1962, of M. I. Rosenberg and of common assignee herewith.

For a better understanding of these and other features and advantages of the present invention, reference is made to the following drawings, in which:

FIG. 1 is a block diagram illustrating an overall ignition system in which the present invention is preferably employed;

FIG. 2 is a sectional view of the pulse generating apparatus in accordance with the present invention;

FIG. 3 is an enlarged sectional view taken along line 3—3 of FIG. 2;

FIG. 4 is a sectional view taken along line 4—4 of FIG. 3;

FIG. 5 is a sectional view taken along line 5—5 of FIG. 3;

FIG. 6 is a perspective view of the core and coil assembly of FIG. 4; and

FIG. 7 is an exploded perspective view of the permanent magnet and pole pieces of the rotor structure of FIG. 3.

The permanent magnet rotor and pulse generating apparatus in accordance with the present invention are capable of use with a wide variety of different electrical apparatuses. The permanent magnet rotor and pulse generating apparatus can be employed to produce electrical pulses in electrical systems employing periodic control pulses, and can advantageously be employed in ignition systems of the type having controllable switch means for connecting a source of voltage to ignition means in response to a control pulse signal. The present invention, although capable of use with a wide variety of different electrical systems, will be shown and described in a form useful for producing control pulses to actuate switch means in an ignition system of the type referred to above.

Referring now to FIG. 1, there is represented therein an ignition system, which may employ the pulse generating apparatus of the present invention, in use in conjunction with an engine 10, which may be a conventional gasoline engine. For purposes of illustration, it will be assumed that the engine 10 has six cylinders each with an associated spark plug for igniting combustible fuel in the corresponding cylinder and that the engine is of the usual four-cycle type. The proper timing relation for firing the fuel in the engine cylinders is provided by engine ignition means 12 which will ordinarily comprise circuitry including six spark plugs, one for each cylinder of engine 10. The function of the remainder of the ignition system of FIG. 1 is to provide appropriate voltage pulses to the engine ignition means in sequence so that each voltage pulse fires the proper spark plug at the proper time. To provide the proper voltage pulses, there is provided a source of voltage 14, which may be a conventional D.C. battery. The voltage output from the source of voltage 14 is supplied to controllable switch means 16. The switch means 16 has, in this example, six output connections 18, 20, 22, 24, 26 and 28, each of which is effective to connect the output voltage from voltage source 14 to a different particular one of the spark plugs in the engine ignition means 12, depending upon which of input lines 30, 32, 34, 36, 38 and 40 is supplied with a trigger control pulse for triggering the particular switch means connection. More specifically, input lines 30, 32, 34, 36, 38 and 40 conduct the trigger control pulses to different ones of six solid state switching circuits, for example, to actuate a particular one of the solid state switching circuits to connect the output voltage of voltage source 14 to fire one of the six spark plugs connected to one of the output lines 18, 20, 22, 24, 26 and 28. Therefore, to produce firing of any one of the six cylinders by engine ignition means 12, it is only necessary to apply a trigger control pulse to the appropriate one of the trigger input lines 30–40 to render conductive the appropriate one of the solid state switching circuits in the switch means 16, thereby permitting current to flow from the voltage source to the appropriate spark plug in the engine ignition means.

The details of a switching circuit of an ignition system in accordance with the block diagram of FIG. 1 is disclosed in detail in the above-mentioned patent of Rosenberg. The switching circuit disclosed in the Rosenberg patent is of the transistorized type and is responsive to control pulses to connect a source of voltage to engine ignition means. Other types of solid state switching devices could be employed, such as, silicon-controlled rectifiers as disclosed in U.S. Patent No. 3,311,783, entitled, "Ignition Apparatus for Internal Combustion Engines and the Like," issued Mar. 28, 1967, of Leslie E. Gibbs et al. and of common assignee herewith.

To generate the necessary trigger control pulses at the required times in relation to the phase of engine operation for which fuel combustion is desired, there is preferably employed trigger pulse generator 42 having output leads 30–40. The trigger pulse generator comprises a number of conductors equal to the number of cylinders of the engine, spaced from each other circumferentially around a center and a rotor having flux generating means, which is rotatable about its center so as to induce pulses sequentially in the several conductors, as will be explained more fully hereinafter. The rotor in the trigger pulse generator may be geared to crank shaft 44 of engine 10 by way of gearing 46 so that trigger control pulses are produced by the generator at a rate in sequence with engine operation to actuate the switch means to connect the voltage source to fire the appropriate spark plug. The trigger pulse generator is arranged so that trigger control pulses are produced at its output lines on the proper lines for effecting the desired sequence of the spark plug firing, this sequence being selected in appropriate fashion for the particular engine application according to principles well known in the art.

In accordance with the present invention, the trigger pulse generator indicated as block 42 in FIG. 1 is shown in detail in FIGS. 2–7. The trigger pulse generator shown in FIG. 2 comprises a rotor generally designated 50 and a stator including, in the present instance, six inductors generally designated 52, 54, 56, 58, 60 and 62 symmetrically spaced along the path of travel of rotor 50 and attached to housing 64 of aluminum, as by screws. As rotor 50 rotates, trigger pulses are induced in the inductors 52, 54, 56, 58, 60 and 62 and are supplied to the controllable switch means by lines 30, 32, 34, 36, 38 and 40, respectively, in sequence with engine operation.

More specifically, as shown in FIGS. 2 and 3, rotor 50 includes a support member 65 of non-magnetic material providing a hub which is preferably supported by a driving shaft 66 geared to the crank shaft 44 of engine 10 by way of gearing 46, as explained in regard to FIG. 1, so that trigger pulses are produced in the inductors in sequence with engine operation. As shown in FIGS. 2 and 3, the support hub 65 of rotor 50 is keyed to shaft 66 to rotate therewith. Support hub 65 is generally annular in form with a portion omitted along one side of its periphery to provide flats 67 and 69 on opposite sides of and perpendicular to a radially-extending flange 68, which extends the axial length of the support member. In the present instance, flange 68 of support hub 65 provides a portion of the support member to which a magnetic structure, comprising pole pieces and a permanent magnet, may be attached to the support hub.

As shown in FIGS. 2, 3 and 5, pole pieces 70 and 72 of magnetic material are attached to radially extending flange 68 on opposite sides of the flange as by rivets with a permanent magnet 74 captured between the pole pieces 70 and 72 such that the magnet and pole pieces provide a magnetic structure offset to one side of the axis of rotation of the support hub. The pole pieces and magnet are oriented generally parallel to the axis of rotation of the support hub with the magnet having a flux axis generally transverse to the axis of rotation. The permanent magnet 74 is preferably a flat rectangular piece of permanent magnetic material, such as, a ferrite ceramic material. Permanent magnet 74 is preferably faced polarized with opposite faces 74a and 74b, providing north and south poles, adjacent pole pieces 70 and 72, respectively. As shown in FIG. 2, permanent magnet 74 is preferably of a width slightly less than the width of the flange 68 of support member 65 so that it may be received between portions of the pole pieces 70 and 72.

In order to secure the magnet between the generally parallel extending pole pieces, which are secured on opposite sides of flange 68, an epoxy resin is preferably placed on opposite faces 74a and 74b of the permanent magnet to hold the magnet fixed relative to the inner surfaces of pole pieces 70 and 72, respectively. To further hold the magnet against axial movement relative to the pole pieces, each of pole pieces 70 and 72 is provided with side flanges 70a and 72a, respectively, which are bent inwardly adjacent opposite ends of the magnet, as shown in FIGS. 5 and 7.

To complete the enclosure of the magnet by the pole pieces and to provide pole faces on the pole pieces which project radially outwardly and are aligned parallel to the axis of rotation of the support member, pole piece 70 is provided with pole face 70b formed by an outwardly extending curve portion near one end of pole piece 70, and pole piece 72 is provided with pole face 72b formed by an outwardly extending curved portion near the opposite end of pole piece 72, as shown in FIG. 7, so that the pole faces 70b and 72b are adjacent opposite ends of the magnet, separated from each other along a direction parallel to the axis of rotation of the rotor, and are aligned parallel with the axis of rotation of the rotor. In this manner the pole pieces provide remote pole faces 70b and 72b to define an outer periphery of the rotor. As should be appreciated from the foregoing description, the two pole pieces 70 and 72 are identical in design and are placed on opposite sides of permanent magnet 74 so that the pole faces 70b and 72b of the two pole pieces provide magnetic poles of opposite polarity for generating magnetic flux to induce pulses in inductors 52, 54, 56, 58, 60 and 62.

Since the magnet in accordance with the present invention is supported at the periphery of the rotor and closely adjacent the pole faces of the rotor, magnetic materials of less flux density may be employed in the magnet then employed in axially supported annular magnets of prior art rotors. The flux produced by the present magnet does not have to travel a long distance through arms providing flux paths to conduct flux from a magnet to pole faces of the rotor. Furthermore, the rotor structure of the present invention is much more easy to manufacture and assemble in that the magnet requires less machining, does not have to be demagnetized and remagnetized in fabrication, and is easier to support in the present rotor.

The remote pole faces 70b and 72b of the rotor are rotated about the axis of rotation of shaft 66 and the inductors are symmetrically spaced along and adjacent to the path of travel of the pole faces of the rotor. More specifically, as shown in FIGS. 2, 3, 4 and 6, inductor 52 and the other inductors 54, 56, 58, 60 and 62 which are like it, comprise a core member 80 of magnetic material having a coil 82 of wire wound on a portion of the core. In pulses generating apparatuses of the prior art, the core members of the inductors, which were symmetrically spaced along the path of travel of the rotor, comprised a bar of magnetic material with a nylon bobbin, for example, around the core on which the coil was wound. The core bar has been attached to a curved non-magnetic member of plastic, which is adapted to conform to the inner curved surface of the housing for the apparatus. However, in a mass production of inductors, the plastic member fixed to the housing has not been held to extremely exacting tolerances and the plastic members have broken when riveted to the support housing since they have not conformed exactly to the interior of the housing. In order to avoid these problems and provide a more inexpensive core to manufacture and assemble, core member 80 has a central portion 84 around which the coil 82 is wound and end portions 86 and 88 providing legs 86a and 88a, respectively, which are bent in opposite directions to be arcuate in form to conform to the inner surface of the housing. The legs of the core member may be secured to the housing as shown in FIG. 2. The metal legs of the core member assure that the support structure for the inductor is strong and rigid so that upon attachment of the legs of the core member to the housing there is no possibility of breakage of the support for the inductor.

In the present instance, nylon bobbin 90 is split and placed over the central portion 86 of the core member 80, the bobbin having increased thickness portions to receive and support terminal members 92 and 94 for the coil. The coil 82 is wound on the bobbin with opposite ends of the core being attached to terminal members 92 and 94 as shown in FIGS. 4 and 6. Each of the inductors are identical in design to inductor 52, as previously described, and are connected to the respective trigger input lines 30–40 at terminal end of the coil, the other terminal being connected to electrical ground.

In operation of the pulse generating apparatus of FIGS. 2 and 3, when the rotor 50 is rotated so as to move the pole faces 70b and 72b adjacent the core members of the inductors, the magnetic flux generated by permanent magnet 74 passes through the pole faces to the particular core member adjacent the pole faces. The low magnetic reluctance of the core member causes the magnetic flux generated by magnet 74 to pass from the pole faces through the end portions of the core, aligned with and close to the pole faces, and through the central portion of the core and back through the magnetic path to the magnet. This flux through the inductor core increases rapidly as the pole faces are rotated to align with the core, and thereafter decreases rapidly as the pole faces pass from alignment with the core. The result is a generation of a positive pulse and a negative pulse of voltage in sequence across the coil winding of a particular inductor. The positive pulse, for example, generated in the coil 82 of inductor 52 and applied through trigger input line 30 is effective to render the appropriate control switch means conductive to connect the voltage source 14 to the appropriate particular one of the engine ignition means to fire the spark plug of the cylinder ready to be fired. The same action occurs in sequence in the five other inductors to actuate the switch means to facilitate firing of the other five spark plugs in proper sequence.

It will be observed that the permanent rotor in accordance with the present invention provides many advantages over prior art permanent magnet rotors. The rotor of the present invention enables a savings in cost in fabrication of the magnet and the magnet is supported at the periphery of the rotor closer to the inductors so that it may be of a reduced flux density yet provide the same flux generating capacity through the inductors. Furthermore, the permanent magnet rotor as provided in the present instance is much more inexpensive to manufacture and assemble than those of the prior art. Moreover, the overall pulse generating means employing the core and inductors in combination with the permanent magnet rotor provides a new and inexpensive structure which is easy to manufacture and assemble. It will be appreciated by those skilled in the art that the pulse generating means of the present invention provides an inexpensive structure that is useful in a wide variety of applications to produce control pulses for actuation of electronic apparatus and is particularly useful in ignition systems of the type employing switch means which is actuated to connect an output voltage to ignition means for firing engine spark plugs.

While the present invention has been described with particular reference to a specific embodiment thereof in the interest of complete definiteness, it should be understood that it may be embodied in a large variety of forms diverse from the one specifically shown and described without departing from the scope and spirit of the invention as defined by the appended claims.

I claim:

1. A permanent magnet rotor comprising support means of non-magnetic material having an axis about which said support means is to be rotated; and a magnetic structure supported by the support means and offset to one side of the axis of rotation to travel around the axis, said magnetic structure including a permanent magnet having a pair of polarized faces and a pair of pole pieces having portions adjacent the polarized faces of the permanent magnet and portions extending outwardly therefrom and terminating in remote pole faces of opposite polarity defining an outer periphery of the rotor.

2. The permanent magnet rotor of claim 1 in which the magnet has a flux axis generally transverse to the axis of rotation.

3. A permanent magnet rotor of claim 1 in which the support means comprises a hub having a peripheral portion adapted to have the pole pieces attached thereto, the magnet being held between the pole pieces.

4. The permanent magnet rotor of claim 1 in which the pole pieces are generally aligned parallel to the axis of rotation.

5. The permanent magnet rotor of claim 1 in which the support means is adapted to receive the shaft, and the permanent magnet and pole pieces are supported at the outer periphery of the support means.

6. The permanent magnet rotor of claim 5 in which the magnet and pole pieces are generally aligned parallel to the axis of rotation of the support means.

7. The permanent magnet rotor of claim 1 in which the support means has a radially extending flange from the periphery of the support means, the pole pieces being attached to the radial flange, and the magnet being held between the pole pieces.

8. The permanent magnet rotor of claim 7 in which the flange of the support means, the permanent magnet and pole pieces are generally aligned parallel to the axis of rotation of the support means.

9. A permanent magnet rotor comprising: support means of non-magnetic material having an axis about which said support means is to be rotated, a permanent magnet having a pair of faces polarized, and a pair of pole pieces mounted on the support means and having portions adjacent the polarized faces of the permanent magnet and portions extending outwardly therefrom and terminating in remote pole faces of opposite polarity defining an outer periphery of the rotor the magnet and pole pieces being supported offset from the axis of rotation of the support means to travel around the axis.

10. A pulse generating apparatus comprising: a stator member including at least one core of magnetic material supported on a frame and a coil of wire wound on the core; and a rotor member including support means of non-magnetic material having an axis about which said support means is to be rotated, and a magnetic structure supported by the support means and offset to one side of the axis of rotation of the support means to travel around the axis, said magnetic structure including a permanent magnet having a pair of polarized faces and a pair of pole pieces having portions adjacent the polarized faces of the permanent magnet and portions extending outwardly therefrom and terminating in remote pole faces of opposite polarity defining an outer periphery of the rotor member adapted to move past the core such that the core completes a flux path between the remote pole faces and pulses are generated in the coil each rotation of the rotor member.

11. The pulse generating apparatus of claim 10 in which the magnet has a flux axis generally transverse to the axis of rotation of the support means.

12. The pulse generating apparatus of claim 10 in which the pole pieces are generally aligned parallel to the axis of rotation of the support means.

13. The pulse generating apparatus of claim 10 in which a plurality of coil and core assemblies are spaced along the path of travel of the remote pole faces of the rotor such that pulses are generated in each of the coils successively as the rotor rotates.

14. The pulse generating apparatus of claim 10 in which the core comprises a member of magnetic material having a first portion on which the coil is wound to complete a flux path between the pole faces and a second portion adapted to be fastened to the frame, and means is provided for fastening the second portion to the frame.

15. The pulse generating apparatus of claim 10 in which the core comprises a member of magnetic material having a central portion on which the coil is wound and end portions providing legs bent out of the plane of the member for being fastened to the frame, and means is provided for fastening the legs to the frame.

16. The pulse generating apparatus of claim 10 in which the support means comprises a hub having a peripheral portion adapted to have the pole pieces attached thereto, the magnet being held between the pole pieces.

17. The pulse generating apparatus of claim 10 in which the support means has a radially extending flange, the pole pieces being attached to the radial flange, and the magnet being held between the pole pieces.

18. The pulse generating apparatus of claim 17 in which the flange, pole pieces and magnet are generally aligned parallel to the axis of rotation of the support means.

19. In an ignition system for an internal combustion engine including a source of voltage, engine fuel ignition means for igniting fuel in the engine, and controllable switch means for connecting the source of voltage to the engine fuel ignition means in response to control pulses, the improvement which comprises: a stator member including a core of magnetic material supported on a frame and a coil of wire wound on the core; and a rotor member including support means of non-magnetic material having an axis about which said support means is to be rotated, and a magnetic structure supported on the support means, at one side of the axis of rotation of the support means, said magnetic structure including a permanent magnet having a pair of polarized faces, a pair of pole pieces having portions adjacent the polarized faces of the permanent magnet and portions extending outwardly therefrom and terminating in remote pole faces of opposite polarity defining an outer periphery of the rotor member adapted to move past the core such that the core completes a flux path between the remote pole faces and control pulses are generated in the coil each rotation of the rotor, and means for connecting the coil to the switch means so that the switch means is responsive to the control pulses to connect the source of voltage to the ignition means.

20. The ignition system of claim 19 in which the portions of the pole pieces providing remote pole faces are separated from each other along the direction parallel to the axis of rotation of the support means.

21. The ignition system of claim 19 in which the remote pole faces are generally aligned parallel to the axis of rotation of the support means.

22. The ignition system of claim 19 in which the core comprises a member of magnetic material having a central portion on which the coil is wound and end portions providing legs bent out of the plane of the member for being fastened to the frame, and means is provided for connecting the legs to the frame.

23. The ignition system of claim 19 in which the support means comprises a hub having a peripheral portion adapted to have the pole pieces attached thereto, the magnet being held between the pole pieces.

24. The ignition system of claim 19 in which the support means has a radially extending flange, the pole pieces being attached to the radial flange, and the magnet being held between the pole pieces.

25. The ignition system of claim 24 in which the flange magnet and pole pieces are generally aligned parallel to the axis of rotation of the support means.

26. The ignition system of claim 19 in which a plurality of coil and core assemblies are spaced along the path of travel of the remote pole faces of the rotor such that control pulses are generated in each of the coils successively as the rotor rotates, one coil being provided for each cylinder of the engine and one ignition means being assocaited with each cylinder of the engine, and means is provided for rotating the rotor member past the coils in synchronism with engine operation to generate the control pulses in the coils such that the switch means is responsive to the successive control pulses to connect the source of voltage to the appropirate one of the ignition means in synchronism with engine operation.

27. In an ignition system for an internal combustion engine including a source of voltage, engine fuel ignition means, and controllable switch means for connecting the source of voltage to the engine fuel ignition means in response to a control signal, the improvement comprises: a stator member including a conductor; and a rotor member including support means of non-magnetic material having an axis about which said support means is to be rotated and a magnetic structure supported on the support means and offset to one side of the axis of rotation of the support means to travel around the axis, said magnetic structure including a permanent magnet having a pair of polarized faces, a pair of pole pieces having portions adjacent the polarized faces of the permanent magnet and portions terminating in remote pole faces of opposite polarity defining an outer periphery of the rotor member adapted to move past the conductor such such that a control signal is generated in the conductor each rotation of the rotor, and means for connecting the conductor to the switch means so that the switch means is respective to the control signal to connect the source of voltage to the ignition means.

28. The ignition system of claim 27 in which the pole pieces are generally aligned parallel to the axis of rotation and the magnet has a flux axis generally transverse to the axis of rotation.

References Cited

UNITED STATES PATENTS

| 3,034,018 | 5/1962 | Rosenberg | 315—205 |
| 3,150,278 | 9/1964 | Clark | 310—156 XR |
| 3,152,281 | 10/1964 | Robbins. | |
| 3,198,973 | 8/1965 | Short et al. | 310—156 XR |
| 3,311,783 | 3/1967 | Gibbs et al. | |

LAURENCE M. GOODRIDGE, *Primary Examiner.*

U.S. Cl. X.R.

310—156; 315—209